US012576801B2

(12) United States Patent
Burgsmüller et al.

(10) Patent No.: US 12,576,801 B2
(45) Date of Patent: Mar. 17, 2026

(54) PIVOTING ARRANGEMENT AND CABLE-GUIDE ARRANGEMENT

(71) Applicant: NEWFREY LLC, New Britain, CT (US)

(72) Inventors: Henrik Burgsmüller, Giessen (DE); Anton Konstanz, Giessen (DE); Bastian Stau, Giessen (DE)

(73) Assignee: Newfrey LLC, New Britain, CT (US)

( * ) Notice: Subject to any disclaimer, the term of this patent is extended or adjusted under 35 U.S.C. 154(b) by 0 days.

(21) Appl. No.: 18/598,959

(22) Filed: Mar. 7, 2024

(65) Prior Publication Data

US 2024/0208437 A1 Jun. 27, 2024

Related U.S. Application Data

(63) Continuation of application No. PCT/EP2022/074407, filed on Sep. 1, 2022.

(30) Foreign Application Priority Data

Sep. 9, 2021 (EP) ..................................... 21195764

(51) Int. Cl.
*B60R 16/02* (2006.01)
*B60R 16/027* (2006.01)
(Continued)

(52) U.S. Cl.
CPC ...... *B60R 16/0215* (2013.01); *B60R 16/0207* (2013.01); *B60R 16/027* (2013.01); *H01R 13/5202* (2013.01); *H02G 11/006* (2013.01)

(58) Field of Classification Search
CPC .............. B60R 16/0215; B60R 16/027; B60R 16/0222; B60R 16/0207; H01R 13/5202;
(Continued)

(56) References Cited

U.S. PATENT DOCUMENTS

| | | | | |
|---|---|---|---|---|
| 3,992,569 A | * | 11/1976 | Hankins | H02G 15/003 |
| | | | | 174/76 |
| 5,405,672 A | * | 4/1995 | Takiguchi | B60R 16/0222 |
| | | | | 428/161 |

(Continued)

FOREIGN PATENT DOCUMENTS

| | | | | | |
|---|---|---|---|---|---|
| CN | 109417280 B | * | 1/2021 | ......... | B60R 16/0215 |
| DE | 102007017286 A1 | * | 10/2008 | ................ | B60J 5/06 |

(Continued)

OTHER PUBLICATIONS

Written Opinion of the International Searching Authority Dated Mar. 5, 2024, cited in corresponding PCT Patent Application No. PCT/EP2022/074407.

(Continued)

*Primary Examiner* — Taylor Morris

(74) *Attorney, Agent, or Firm* — Harness, Dickey & Pierce, P.L.C.

(57) ABSTRACT

Cable-guide arrangement for a motor vehicle sliding door and pivoting arrangement comprising a pivoting arm adapted to receive cables and a support member adapted to be arranged on a vehicle body. The support member comprises a base plate with a first and a second receiving portion, the pivoting arm rotatably mounted to the support member. A cap is connected to the base plate and defines with the base plate a protective chamber, in which the cables can extend. The pivoting arm is a two-part piece having a first casing and a second casing with a sealing ring.

20 Claims, 3 Drawing Sheets

(51) Int. Cl.
*H01R 13/52* (2006.01)
*H02G 11/00* (2006.01)

(58) Field of Classification Search
CPC .......................... H01R 13/521; H01R 13/5205; H01R 13/502; H02G 15/113; H02G 11/006
USPC ....................................................... 174/72 A
See application file for complete search history.

(56) References Cited

U.S. PATENT DOCUMENTS

| | | | | |
|---|---|---|---|---|
| 5,669,763 A * | 9/1997 | Pryce | .................... | F02M 37/10 |
| | | | | 439/942 |
| 5,684,911 A * | 11/1997 | Burgett | .................. | G02B 6/501 |
| | | | | 385/56 |
| 5,700,977 A * | 12/1997 | Ford | ...................... | H02B 1/202 |
| | | | | 174/64 |
| 6,099,340 A * | 8/2000 | Florentine | ............ | H02G 15/113 |
| | | | | 439/367 |
| 6,117,084 A * | 9/2000 | Green | ...................... | A61B 8/00 |
| | | | | 600/459 |
| 7,220,129 B1 * | 5/2007 | Nishijima | ............ | H02G 11/006 |
| | | | | 174/72 A |
| 7,284,785 B2 | 10/2007 | Gotou et al. | | |
| 7,482,538 B2 * | 1/2009 | Kisu | ................... | B60R 16/0215 |
| | | | | 174/72 A |
| 7,694,814 B1 * | 4/2010 | Cristobal | ................. | A61B 8/00 |
| | | | | 600/459 |
| 7,738,761 B2 * | 6/2010 | Mullaney | ............. | G02B 6/4447 |
| | | | | 385/136 |
| 7,862,380 B1 * | 1/2011 | Wang | ..................... | H01R 13/52 |
| | | | | 439/694 |
| 7,905,537 B2 | 3/2011 | Sato et al. | | |
| 8,167,634 B2 * | 5/2012 | Fujiwara | ............ | H01R 13/5202 |
| | | | | 439/271 |
| 9,029,700 B2 * | 5/2015 | Hara | ................... | B60R 16/0215 |
| | | | | 174/72 A |
| 9,166,329 B2 * | 10/2015 | Eckel | ................... | H01R 13/533 |
| 9,956,929 B2 | 5/2018 | Sekino et al. | | |
| 10,086,780 B2 * | 10/2018 | Sekino | ................ | B60R 16/0215 |
| 10,486,622 B2 * | 11/2019 | Kato | .................... | H01R 13/631 |
| 10,574,001 B2 * | 2/2020 | Data | ...................... | H01R 13/53 |
| 10,626,646 B1 * | 4/2020 | Amador | .............. | E05D 11/0081 |
| 10,753,510 B2 * | 8/2020 | Hafner | .................... | F16L 5/025 |
| 12,162,414 B2 * | 12/2024 | Stau | ............................ | B60J 5/06 |
| 2003/0015340 A1 * | 1/2003 | Tsukamoto | ......... | B60R 16/0215 |
| | | | | 174/72 A |
| 2007/0084619 A1 * | 4/2007 | Kisu | ................... | B60R 16/0215 |
| | | | | 174/72 A |
| 2007/0119610 A1 * | 5/2007 | Kisu | ................... | H02G 11/006 |
| | | | | 174/72 A |
| 2009/0140107 A1 * | 6/2009 | Murayama | .......... | B60R 16/0215 |
| | | | | 248/60 |
| 2009/0200062 A1 * | 8/2009 | Aoki | ...................... | H02G 11/00 |
| | | | | 174/136 |
| 2014/0073158 A1 * | 3/2014 | Hong | ..................... | H01R 13/52 |
| | | | | 439/660 |
| 2016/0207480 A1 * | 7/2016 | Sekino | .................... | B60R 16/03 |
| 2016/0264076 A1 * | 9/2016 | Kogure | .................... | H02G 3/04 |
| 2017/0297515 A1 | 10/2017 | Sekino et al. | | |
| 2020/0176922 A1 * | 6/2020 | Jagminas | ........... | H01R 13/5202 |
| 2020/0231103 A1 * | 7/2020 | Mori | ................... | B60R 16/0222 |
| 2020/0384835 A1 * | 12/2020 | Yamashita | ................. | B60J 5/06 |
| 2021/0016725 A1 * | 1/2021 | Yamashita | ............ | E05F 15/655 |
| 2023/0271573 A1 * | 8/2023 | Kogure | .................. | B60R 16/02 |
| | | | | 174/151 |
| 2025/0100471 A1 * | 3/2025 | Yamashita | .......... | B60R 16/0215 |

FOREIGN PATENT DOCUMENTS

| | | | | |
|---|---|---|---|---|
| DE | 102006061641 B4 | 9/2009 | | |
| DE | 102006061638 B4 | 8/2010 | | |
| DE | 102014220607 A1 * | 4/2015 | ........ | B60R 16/0215 |
| EP | 3072749 A1 | 9/2016 | | |
| FR | 3010247 B1 | 9/2015 | | |
| WO | WO-2015053216 A1 * | 4/2015 | .......... | B60R 16/027 |
| WO | WO-2021160884 A1 * | 8/2021 | ............... | B60J 5/06 |

OTHER PUBLICATIONS

International Search Report Dated Nov. 9, 2022, cited in corresponding PCT Patent Application No. PCT/EP2022/074407.
European Search Report Dated Feb. 24, 2022, cited in corresponding EP Patent Application No. 21195764.2.

* cited by examiner

PIVOTING ARRANGEMENT AND CABLE-GUIDE ARRANGEMENT

CROSS-REFERENCE TO RELATED APPLICATIONS

This application is a continuation of PCT Application No. PCT/EP2022/074407, filed Sep. 1, 2022, which claims priority from European Patent Application No. 21195764.2, filed Sep. 1, 2021, the disclosure of which is incorporated herein by reference in its entirety.

BACKGROUND OF THE INVENTION

The present invention relates to a pivoting arrangement for a cable-guide arrangement and to a cable-guide arrangement comprising the same which can be used in particular for a motor vehicle sliding door.

It is customary in modern vehicles to arrange electric loads in the doors and flaps of motor vehicles. These can include, for example, motors for window openers, external lights, internal lights, etc. In the case of sliding doors, this can also be, for example, a motor, by means of which the sliding door can be opened and closed in a motorized manner.

In normal pivoting doors and pivoting flaps (tailgates, engine-compartment covers, etc.), one section of the door or flap in each case remains relatively close to the same part of a vehicle body, for example to an A pillar or the like. Consequently, the provision of a flexible line connection between the vehicle body and the door or flap is generally unproblematical.

It is a different matter in sliding doors. The latter are offset in parallel to a section of a vehicle body, and therefore the distance between a transfer point on the body and a transfer point on the sliding door may differ greatly depending on whether the sliding door is opened or closed.

Besides, in some vehicles equipped with a sliding door, the sliding door can be opened and closed by using electric power. In such a sliding door, harnesses for a power supply and sensors must be routed between the vehicle body and the sliding door.

When routing the harnesses, the harnesses are protected by providing a cable-guide arrangement that retains the harnesses, wires and cables. The cable-guide arrangement is provided because the profile of the harnesses, or specifically, the routing configuration, changes as the sliding door is opened and closed Documents DE 10 2006 061 638 B4 and DE 10 2006 061 641 B4 disclose a cable-guide arrangement, in which an articulation arm pivotably holds a moveable body, such as a sliding door, on a fixed body, such as a vehicle body. A cable form is attached to the articulation arm such that said cable form extends along the articulation arm.

EP3072749A1 is directed to a cable-guide arrangement with a pivoting arm and a bearing part which has a bearing shell section. A cam is formed on the bearing part in the region of the bearing shell section, such that the pivoting arm and the bearing part are captively pre-assembled.

FR3010247A1 discloses a cable-guide arrangement with a wall designed to be attached to the body of a vehicle by means of clips. A pivoting arm is fixed to the wall by a pivot. The pivoting arm is hollow and receives a cable harness.

SUMMARY OF THE INVENTION

Whilst this type of pivoting arrangements and cable-guide arrangements functions effectively, it has been found that its construction may be improved upon in order to provide a pivoting arrangements and cable-guide arrangements easy to manufacture, to assemble and reliable.

It is notably an object of the present invention to provide a pivoting arrangement and a cable-guide arrangement with an improved and reliable sealing.

Accordingly, the present invention provides a pivoting arrangement according to claim 1. The position of the sealing ring within the notch prevent any fluid to enter protective chamber. More particularly, the position of the sealing ring allows a compact and tight pivoting arrangement, reducing the risks of damaging cables and wire harnesses without increasing the size of the entire arrangement. Besides, the two-part pivoting arm simplifies the assembly of the cable. The cable can be snap fitted within the pivoting arm. (A one-part pivoting arm would have to open laterally to be able to mount a cable. This has the disadvantage that moisture can penetrate through the pivoting arm.) The sealing ring is notably directly overmoulded on the second shaft portion.

In an embodiment, the second shaft portion comprises an annular groove extending on an external surface of the second shaft portion. In an embodiment, the sealing ring is arranged within the annular groove. Thus, one can control to which extends the sealing ring radially extends within the notch. Besides, the sealing ring remains in position.

In an embodiment, a cable support sleeve is arranged at a free end of the second shaft portion opposite the first shaft portion. The cable support sleeve improve the sealing while guiding the cable within the protective chamber. The two-parts pivoting arm allows the assembly of such cable support sleeve.

In an embodiment, the base plate comprises a (injection moulded) plate seal arranged on the upper surface, wherein the seal extends between the cap and the base plate. This again improves the sealing properties.

In a further embodiment, the plate seal comprises a first portion extending on a periphery of the upper surface and a second portion extending sensibly orthogonally to the first portion and between the pivoting arm and the second receiving member.

In an embodiment, the plate seal is discontinuous at the notch. Due to the sealing ring, there is no need to provide a continuous plate seal. The position of the sealing ring within the notch, and not at an end surface of the notch (as it would have been the case if the plate seal was continuous) allows a better sealing, but also less maintenance, since it is not visible from the outside and therefore less subject to wear.

In an embodiment, the base plate comprises a ground body, the ground body being sensibly flat with the upper and lower surfaces, and the second receiving portion is formed by a second reinforcing part, the second reinforcing part extending sensibly orthogonal to the ground body. The base plate is thus sensibly compact.

In an embodiment, a first reinforcing part forms the first receiving portion. The first reinforcing part extends sensibly orthogonal to the ground body. The base plate with the first and second reinforcing parts is made integral in one piece of material.

In an embodiment, the base plate comprises an under seal arranged on the lower surface, and wherein the under seal extends on the entire periphery of the lower surface.

In an embodiment, the cap comprises a cap notch and the cap notch and the notch of the base plate cooperate to define an aperture through which the second shaft portion extends.

In an embodiment, a connecting plug is arranged on the lower surface of the base plate. This allows a quick connection with the vehicle body.

The present application is also directed to a cable-guide arrangement for a motor vehicle sliding door, comprising: a cable guide with a plurality of segments articulated in series with each other, a first attachment for connecting the cable guide to a vehicle body, a second attachment for connecting the cable guide to a motor vehicle sliding door, a wire harness extending within the cable guide, wherein the first attachment or the second attachment comprises a pivoting arrangement as previously described. The cable-guide arrangement is compact and tight.

In an embodiment, the first attachment comprises a pivoting arrangement as previously described, and the second attachment comprises a first part adapted to be fixed to the sliding door and a second part movably mounted to the first part. Thus, tolerance compensation is also allowed.

BRIEF DESCRIPTION OF THE DRAWINGS

Other characteristics and advantages of the invention will readily appear from the following description of embodiments, provided as non-limitative examples, in reference to the accompanying drawings.

DETAILED DESCRIPTION OF THE PREFERRED EMBODIMENTS

On the different figures, the same reference signs designate identical or similar elements.

Figure 1:
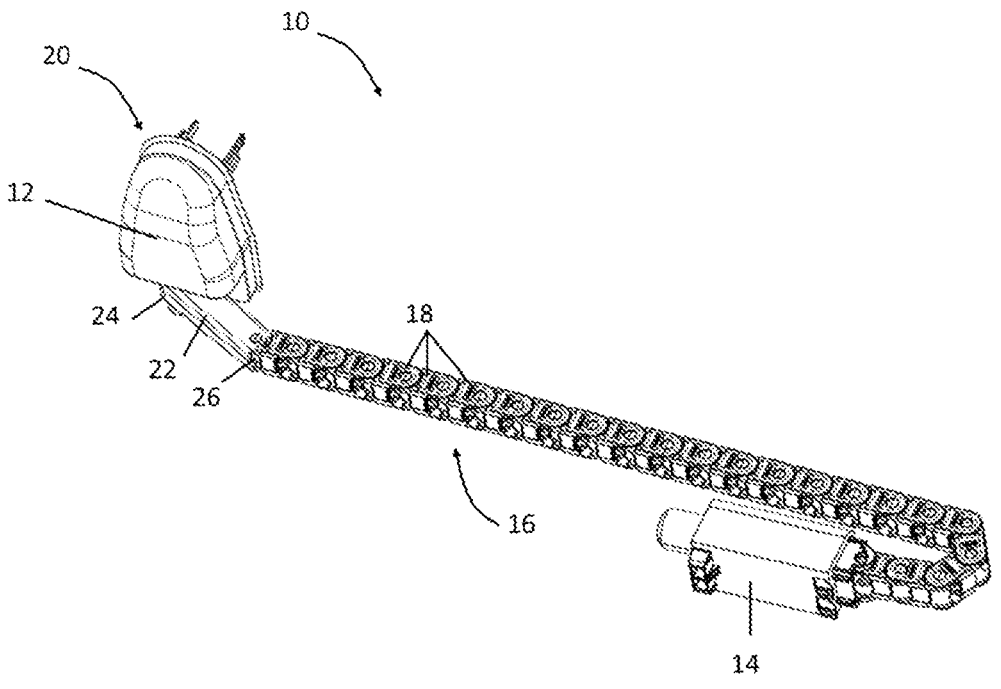
FIG. 1 schematically shows a cable-guide arrangement with a cable guide, a first and a second attachment comprising a pivoting arrangement, according to the invention.
Figure 2:
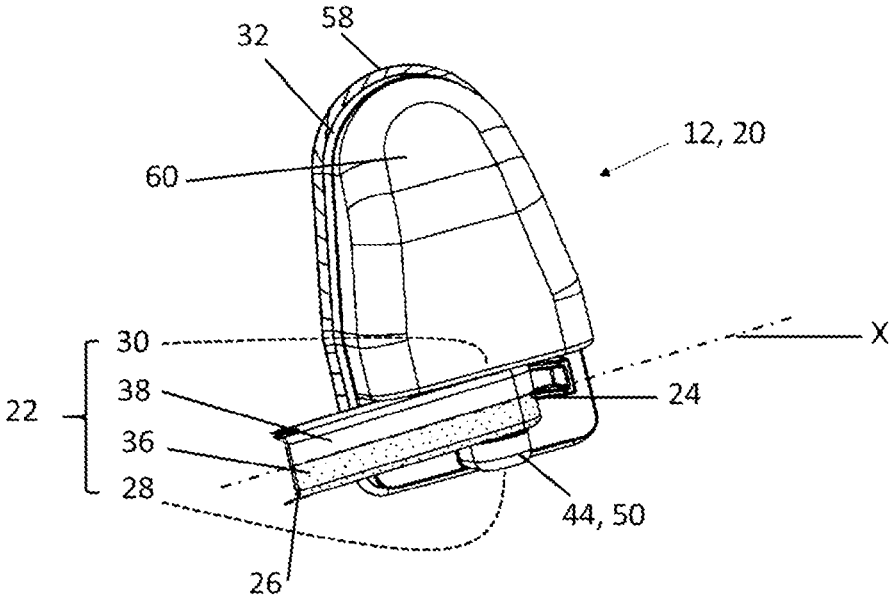
FIG. 2 is a perspective view of the pivoting arrangement of FIG. 1 with a cap, a base plate and a pivoting arm.

FIG. 1 shows a cable guide arrangement 10 for a motor vehicle sliding door. The cable-guide arrangement 10 is for instance provided to securely guide and receive cables, wire(s), harnesses such as for example electricity supply harness or sensor harness, between a vehicle opening and a sliding door destined to close the vehicle opening. The cable guide arrangement 10 protects the cables (or harnesses or wires), whose profile changes between the completely closed position, the intermediate position, and the completely opened position of the sliding door. The cables (harnesses, wires) are not part of the present invention and therefore not shown in the drawings.

The cable guide arrangement 10 comprises on one end a first attachment 12 that is adapted to be installed on the vehicle body. On the other end, a second attachment 14 is provided. The second attachment 14 is adapted to be installed on the sliding door. Between the first and the second attachment 12, 14 a cable-guide 16 that connects the first attachment 12 to the second attachment 14 is provided so as to enclose the cables. The cable guide 16 for instance comprises a plurality of segments 18 articulated in series with each other. For instance, the second attachment 14 comprises a first part adapted to be fixed to the sliding door and a second part movably mounted to the first part. The second attachment 14 and the cable guide 16 will not be further described here, as those skilled in the art appreciate how such parts are assembled.

The first attachment 12 is provided with a pivoting arrangement 20. The pivoting arrangement 20 is more precisely depicted in FIG. 2 to FIG. 5.

The pivoting arrangement 20 comprises a pivoting arm 22. The pivoting arm 22 is adapted to be fixed to an end of the cable guide 16. More particularly, the pivoting arm 22 is adapted to be fixed to an end segment of the cable guide. The pivoting arm 22 longitudinally extends between a first end 24 and a second end 26 along an arm axis X. The pivoting arm comprises a channel 27, the channel 27 longitudinally extends along the arm axis X. The second end 26 of the pivoting arm 22 is destined to be connected to the cable guide 16. The first end 24 of the pivoting arm 22 comprises a first and a second shaft portion 28, 30 and is adapted to be rotatably mounted to a base plate 32.

Figure 3:
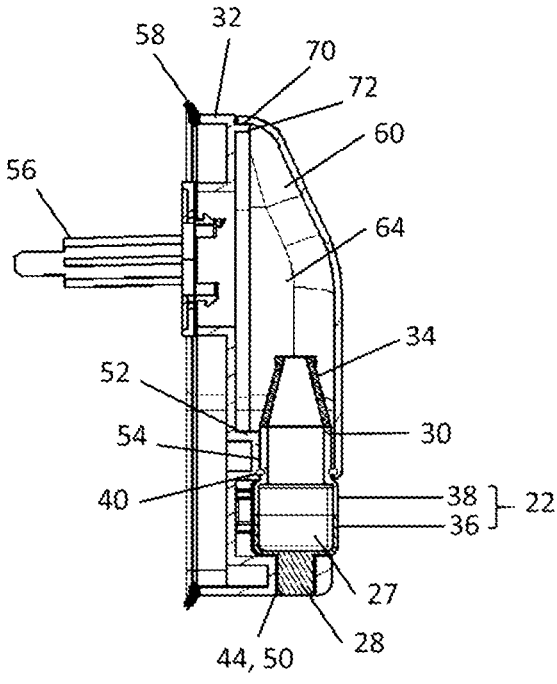
FIG. 3 is a view of the pivoting arrangement of FIG. 2 with the cap being partly hidden.
Figure 4:
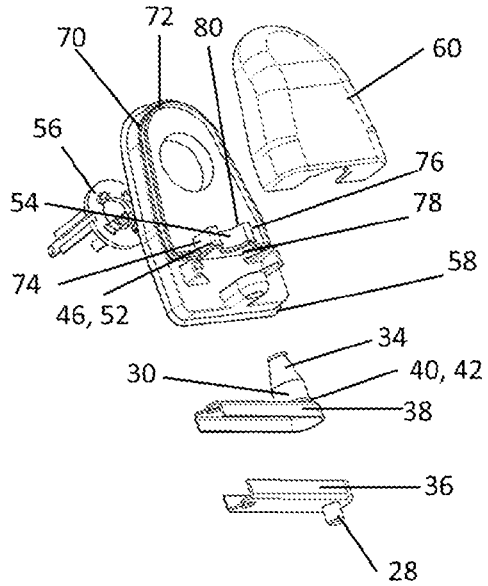
FIG. 4 shows an exploded view of the pivoting arrangement of FIG. 2 with the base plate provided with a connecting plug.

The first shaft portion 28 extends sensibly orthogonal to the arm axis X. For instance, and as depicted in FIG. 3, the first shaft portion 28 is sensibly cylindrical. The second shaft portion 30 extends sensibly orthogonal to the arm axis X. For instance, and as depicted in FIG. 3, the second shaft portion 30 is sensibly cylindrical. The radius of the first shaft portion 28 is smaller than the radius of the second shaft portion 30. The length of the first shaft portion 28 can be slightly smaller than the length of the second shaft portion 30. In another embodiment, the lengths of the first and second shaft portions 28, 30 can be the same. A bottleneck may be provided on the second shaft portion in the vicinity of the channel 27.

The first shaft portion 28 comprises a closed end. The second shaft portion 30 comprises an open end, such that the cables can extend through the second shaft portion 30 and within the channel 27. A cable support sleeve 34 can be arranged at a free end of the second shaft portion 30 opposite the first shaft portion 28. The cable support sleeve 34 is for instance frustoconical and adapted to guide the cables. The greater base edge is directly arranged on the free end of the second shaft portion 30. For example, the greater base edge is fitted to the second shaft portion 30 or is directly over-moulded to the free end of the second shaft portion 30.

The pivoting arm 22 is a two-part piece and comprises a first and a second casing 36, 38. The first and the second casing 36, 38 are connected to each other to form a hollow section adapted to receive wire(s), cable(s) or harness(es). The first casing 36 comprises the first shaft portion 28. The second casing 38 comprises the second shaft portion 30. The first and second casings 36, 38 are sensibly similar in a mirror plane. Each comprises a shaft portion at a first end and a one-half channel. The half channels form the channel 27. The pivoting arm 22 is particularly easy to manufacture with these two parts.

The pivoting arm 22 is provided with a sealing ring 40 extending around the second shaft portion 30. The sealing ring 40 is provided on the second casing 38. For instance, the second shaft portion 30 is sensibly cylindrical and comprises a groove 42. The groove is annular. The sealing ring 40 can extend within the groove 42. The groove 42 is for instance arranged at equal distance from the ends of the second shaft portion. The sealing ring 40 is sensibly annular. The sealing ring 40 protrudes from the outer surface of the second shaft portion 30. The sealing ring 40 is over moulded on the second shaft portion 30. The sealing ring 40 is for instance arranged sensibly in the middle of the second shaft portion 30.

The first and second shaft portions 28, 30 are rotatably mounted to the base plate 32. The base plate 32 has a first receiving portion 44 adapted to receive the first shaft portion 28. The base plate 32 further comprises a second receiving portion 46 adapted to receive the second shaft portion 30. More particularly, the first shaft portion 28 is rotatably received in the first receiving portion 44. The second shaft portion 30 is rotatably received in the second receiving portion 46.

For instance, the base plate 32 comprises a ground body 48 extending sensibly in a base plane. Two reinforcing parts protrudes from the ground body 48. The first reinforcing part 50 extends sensibly perpendicularly to the ground body 48. The second reinforcing part 52 extends sensibly perpendicularly to the ground body 48. The first reinforcing part 50 comprises a hole which forms the first receiving portion 44. The hole may be a blind hole, or as represented a through hole. The first shaft portion 28 extends at least partially within the hole. The second reinforcing part 52 comprises a notch 54. The second reinforcing part 52 with the notch 54 forms the second receiving portion 46. The second shaft portion 30 is arranged within the notch 54. The sealing ring 40 seats on the second shaft portion 30 and extends between the notch 54 and the second shaft portion 30. The position of the sealing ring 40 is such that it is arranged in the middle (or sensibly in the middle) of the notch 54 (in the mounted position of the pivoting arm).

Figure 5:
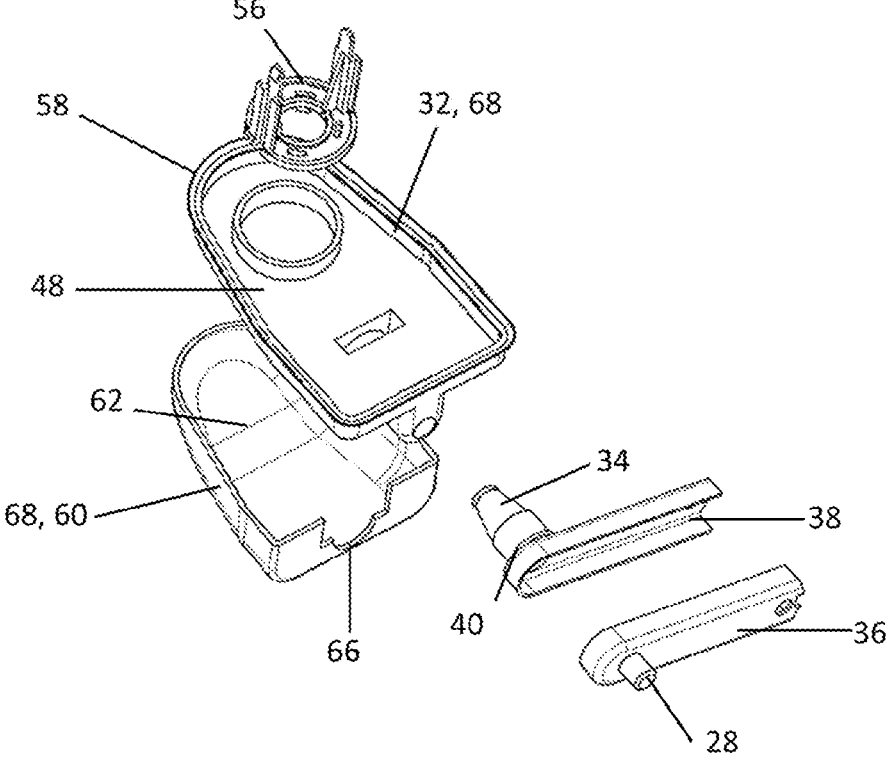
FIG. 5 is a perspective bottom view of the pivoting arrangement of FIG. 4.

The base plate 32 (and more particularly the ground body) comprises an upper surface and a lower surface. The lower surface is adapted to face the body vehicle. For instance, the base plate 32 comprises a connecting plug 56, as depicted in FIG. 5. The connecting plug 56 is arranged on the lower surface and allows a quick connection with the vehicle body.

An under seal 58 is arranged on the lower surface of the base plate 32. The under seal 58 continuously extends on the entire periphery of the lower surface. The under seal 58 ensures sealing between the vehicle body and the base plate 32. The under seal 58 follows the outer contours of the lower surface of the base plate 32. For instance, the under seal 58 is made with the same material than the sealing ring 40. The under seal 58 is overmoulded on the lower surface.

The base plate 32 is adapted to cooperate with a cap 60. The cap 60 is connected to the upper surface of the base plate 32. The cap 60 comprises a recess 62. When mounted together, the cap 60 and the base plate 32 define a protective chambre 64 in which cables (or harness or wires) can extend. The protective chamber is delimited by the wall of the recess 62 and the base plate 32. The cap 60 comprises a cap notch 66 which cooperate with the notch 54 to form an aperture through which the second shaft portion end extends. The base plate 32 and the cap 60 form a support member 68.

The protective chamber 64 is completely tight. A plate seal 70 is arranged between the cap 60 and the upper surface of the base plate 32. The plate seal 70 is overmoulded on the upper surface of the base plate 32. The upper surface comprises a rim 72 and the base plate 32 is overmoulded against the rim 72. The rim 72 extends at the outer contour of a portion of the lower surface facing the second shaft portion 30. The rim 72 then extends parallel to the channel 27 toward the notch 54. The second reinforcing portion 46 comprises a first and second lateral wall 74, 76 and a first and a second side wall 78, 80. The lateral walls 74, 76 extend between the side walls 78, 80. The second side wall 80 is within the protective chamber, wherein the first side wall 78 is either facing the cap 60 or defines with the cap 60 an outer surface outside of the protective chamber 64. The plate seal 70 comprises a first portion extending at a periphery of the base plate and a second portion extending sensibly parallel to the arm axis and arranged between the pivoting arm and the second receiving member. The plate seal 70 is notably discontinuous at the notch 54. The plate seal 70 extends of the first and second lateral wall, in the vicinity of the first side wall, but does not extend inside the notch. The cap 60 entirely follows the contours of the rim 72 and the plate seal 70, such that the protective chamber 64 extends over the second shaft portion (or at least a part of the second shaft portion) and a part of the upper surface of the base plate. The cap 60 does not cover the first shaft portion 28 and the channel 27 formed by the first and second casing extending along the arm axis X. The cap does not cover the first receiving part. The rim 72 and the plate seal 70 follows entirely the contour of the cap 60. The cap notch 66 is not provided with a particular seal, since the sealing ring 40 arranged around the second shaft portion ensure the sealing within the notch and aperture formed by the notch and the cap notch. This allows an easy assembly of the pivoting arrangement 20.

What is claimed is:

1. A pivoting arrangement for a cable guide arrangement for guiding a cable in a vehicle body, wherein the pivoting arrangement comprises:

a pivoting arm longitudinally extending between a first end and a second end along an arm axis, the pivoting arm including a first casing and a second casing, the first casing and the second casing being connected to each other to partially define a hollow channel axially open at the second end and adapted to receive the cable, the first casing including proximate the first end a first shaft extending in a first radial direction, the second casing including proximate the first end a second shaft extending in a second radial direction opposite to the first radial direction, and a sealing ring extends around the second shaft; and a support member adapted to be arranged on the vehicle body, wherein the support member comprises:

a base plate having an upper surface and a lower surface opposite the upper surface, the lower surface adapted to be arranged on the vehicle body, and including a first receiving portion and a second receiving portion, the first shaft rotatably mounted in the first receiving portion, and the second shaft rotatably mounted in the second receiving portion, such that the pivoting arm is rotatably mounted in the support member, wherein the first receiving portion comprises a hole in which the first shaft extends, the second receiving portion comprises a notch, and the sealing ring extends around the second shaft and in the notch, and a cap is joined to the upper surface of the base plate and with the base plate defines a protective chamber through which the cable can extend, wherein the cap comprises a cap notch, and the cap notch and the notch of the base plate cooperate to define an aperture through which the second shaft extends into the protective chamber.

2. The pivoting arrangement according to claim 1, wherein the second shaft includes an annular groove partially defined in an external surface of the second shaft, and the sealing ring is arranged within the annular groove.

3. The pivoting arrangement according to claim 2 wherein the sealing ring extends between the second shaft and the notch in the plate and between the second shaft and the cap notch in the cap.

4. The pivoting arrangement according to claim 1, wherein a cable support sleeve is arranged at a free end of the second shaft opposite the first shaft.

5. The pivoting arrangement according to claim 1, wherein the base plate includes a plate seal arranged on the upper surface, and the plate seal seals between the cap and the base plate.

6. The pivoting arrangement according to claim 5, wherein the plate seal comprises a first seal portion extending on a periphery portion of the upper surface and a second seal portion extending inward from the periphery portion and between the pivoting arm and the second receiving portion.

7. The pivoting arrangement according to claim 5, wherein the plate seal is discontinuous at the notch.

8. The pivoting arrangement according to claim 1, wherein the base plate comprises a ground body, the ground body being flat, and the first receiving portion is formed by a first reinforcing part, the first reinforcing part extending orthogonal to the ground body.

9. The pivoting arrangement according to claim 8, wherein the second receiving portion is formed by a second reinforcing part, the second reinforcing part extending orthogonal to the ground body.

10. The pivoting arrangement according to claim 1, wherein the base plate includes an under seal arranged on the lower surface, and the under seal extends around an entire periphery of the lower surface.

11. The pivoting arrangement according to claim 1, wherein a connecting plug extends orthogonally from the lower surface of the base plate, and the connecting plug is operable for securing the pivoting arrangement to the vehicle body.

12. A cable guide arrangement for a vehicle body including a sliding door, the cable guide arrangement comprising:

a cable guide including a plurality of segments articulated in a series with each other;

a first attachment for connecting the cable guide to the vehicle body; and a second attachment for connecting the cable guide to the sliding door, wherein the first attachment or the second attachment comprises a pivoting arrangement, and the pivoting arrangement comprises:

a pivoting arm longitudinally extending between a first end and a second end along an arm axis, the pivoting arm including a first casing and a second casing, the first casing and the second casing being connected to each other to partially define a hollow channel axially open at the second end and adapted to receive a cable, the first casing including proximate the first end a first shaft extending in a first radial direction, the second casing including proximate the first end a second shaft extending in a second radial direction opposite to the first radial direction, and a sealing ring extends around the second shaft; and a support member adapted to be arranged on the vehicle body, wherein the support member comprises:

a base plate having an upper surface and a lower surface opposite the upper surface, the lower surface adapted to be arranged on the vehicle body, and including a first receiving portion and a second receiving portion, the first shaft rotatably mounted in the first receiving portion, and the second shaft rotatably mounted in the second receiving portion, such that the pivoting arm is rotatably mounted in the support member, and wherein the first receiving portion comprises a hole in which the first shaft extends, the second receiving portion comprises a notch in which the second shaft extends, and the sealing ring extends around the second shaft portion and in the notch, and a cap is joined to the upper surface of the base plate and with the base plate defines a protective chamber through which the cable can extend, wherein the cap has a cap notch that cooperates with the notch in the base plate to form an aperture through which the second shaft extends.

13. The cable guide arrangement according to claim 12, wherein the first attachment includes the pivoting arrangement and is attached to the vehicle body, and the second attachment includes a first part adapted to be fixed to the sliding door and a second part movably mounted to the first part.

14. A cable guide assembly for guiding a cable to a vehicle body part operable for a movement on a vehicle body between a first position and a second position, and wherein the cable guide assembly comprises:

a support member adapted to be secured to the vehicle body and for conducting the cable to the vehicle body; and a pivoting arm rotatably mounted on the support member for conducting the cable into the support member during the movement, wherein the pivoting arm comprises:

a casing extending along an arm axis between a first end and a second end and partially defining a hollow channel extending axially from an opening at the second end;

a first shaft located proximate the first end and extending from the casing in a first direction of a pivot axis;

a second shaft located proximate the first end and extending from the casing in a second direction of the pivot axis opposite to the first direction; and a sealing ring extending around the second shaft, and wherein the support member comprises:

a base plate having an upper surface and a lower surface opposite the upper surface, the lower surface adapted to be arranged on the vehicle body;

a first shaft support in which the first shaft is rotatably mounted;

a second shaft support in which the second shaft is rotatably mounted, wherein the second shaft support includes a semi-cylindrical shaft cradle in which the second shaft is rotatable; and a cap joined to the upper surface of the base plate and with the base plate defining a protective chamber operable for conducting the cable from the pivoting arm to the vehicle body.

15. The cable guide assembly according to claim 14, wherein the first shaft support defines a cylindrical through hole in which the first shaft is rotatable.

16. The cable guide assembly according to claim 14, wherein the casing of the pivoting arm comprises a first casing and a second casing joined longitudinally.

17. The cable guide assembly according to claim 14, wherein:

the first shaft support is located on the base plate outside the cap;

the second shaft support is located on the base plate beneath the cap and within the protective chamber; and

the pivoting arm is rotatably mounted around the pivot axis between the first shaft support and the second shaft support and outside the cap.

18. The cable guide assembly according to claim 14, and further comprising:

a plurality of cable guide segments in an articulated chain having a first chain end and a second chain end;

an attachment for connecting the first chain end to the vehicle body part; and the second chain end is attached to the pivoting arm.

19. The cable guide assembly according to claim 14, wherein the second shaft defines a through bore open to the hollow channel of the pivoting arm and open to the protective chamber and operable for conducting the cable between the pivoting arm and the protective chamber.

20. The cable guide assembly according to claim 14 wherein the cap cooperates with the semi-cylindrical shaft cradle of the second shaft support to form an aperture through which the second shaft extends.

* * * * *